Feb. 22, 1944. K. H. MILLER 2,342,290
JET FOR AIR VELOCITY METERS AND THE LIKE
Filed Nov. 26, 1941 2 Sheets-Sheet 1
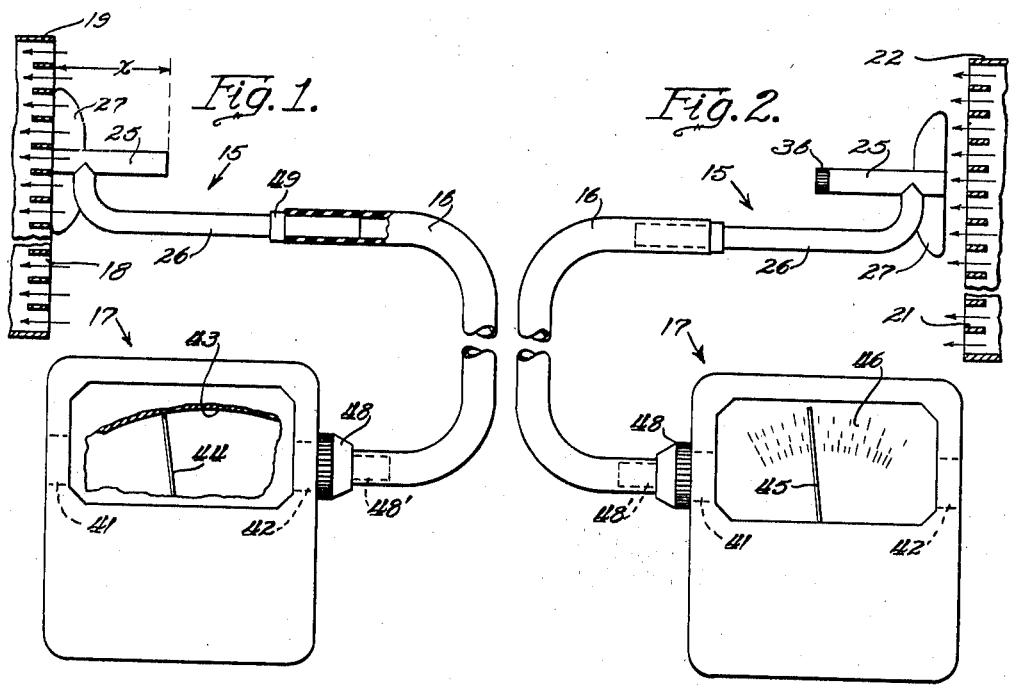
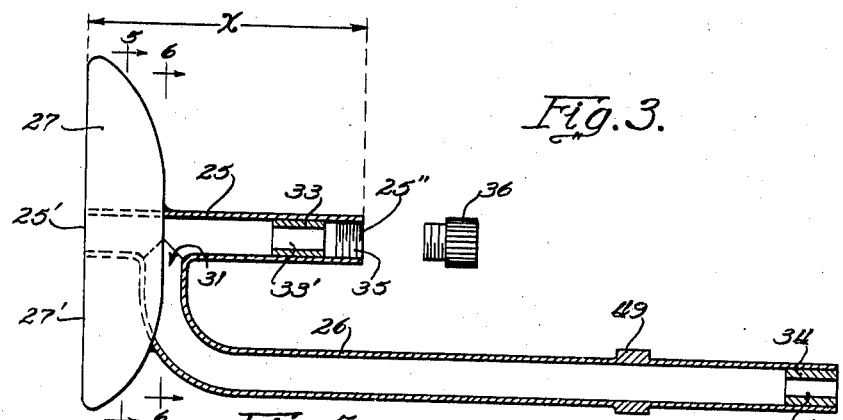
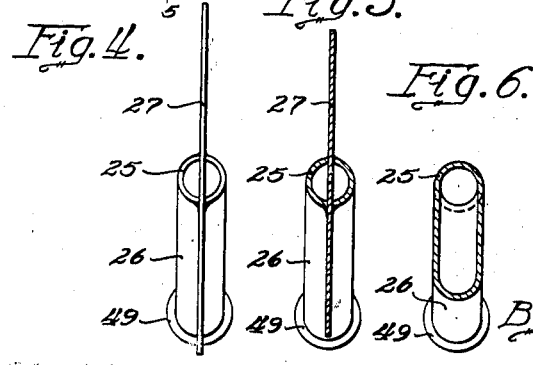
Inventor
Kenneth H. Miller Feb. 22, 1944.　　　K. H. MILLER　　　2,342,290
JET FOR AIR VELOCITY METERS AND THE LIKE
Filed Nov. 26, 1941　　　2 Sheets-Sheet 2
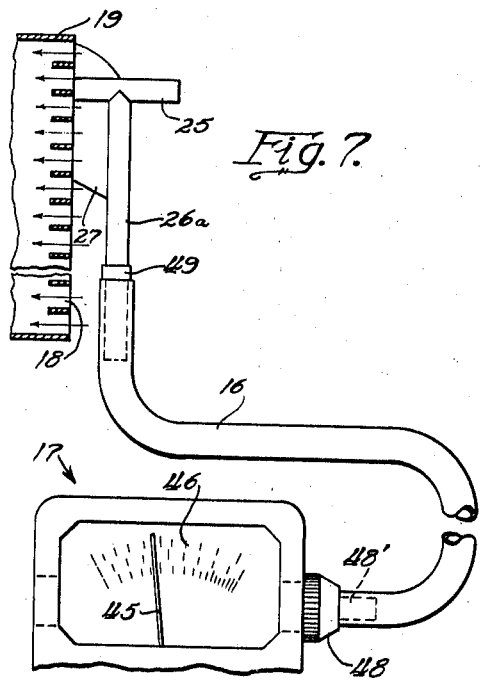
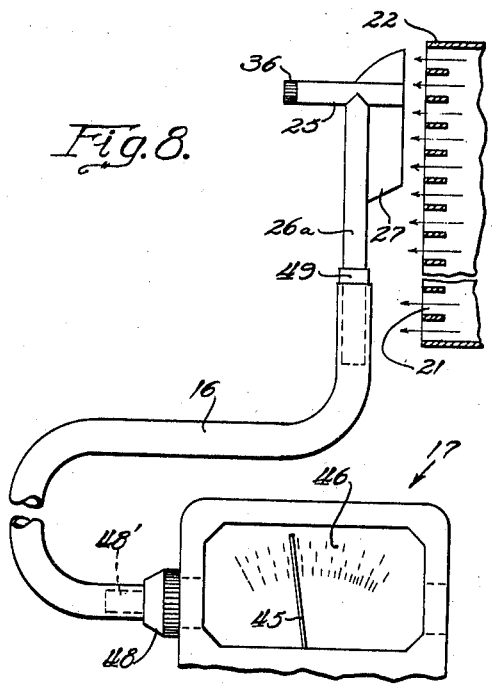
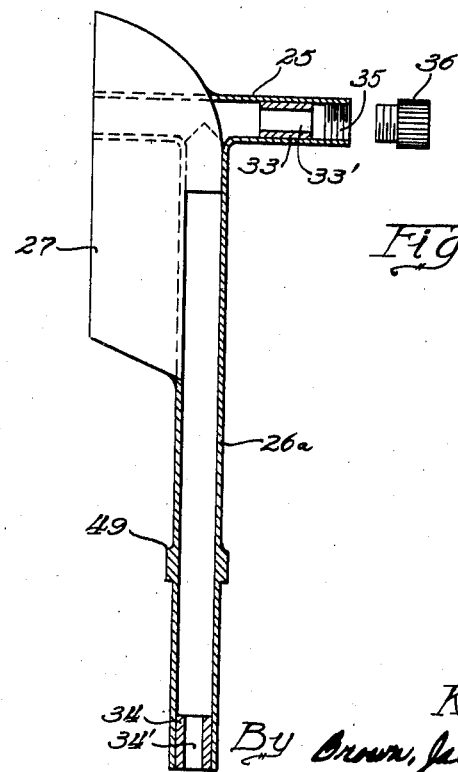
Inventor
Kenneth H. Miller Patented Feb. 22, 1944

2,342,290

UNITED STATES PATENT OFFICE 2,342,290

JET FOR AIR VELOCITY METERS AND THE LIKE

Kenneth H. Miller, Chicago, Ill., assignor to Illinois Testing Laboratories, Inc., Chicago, Ill., a corporation of Illinois Application November 26, 1941, Serial No. 420,452

18 Claims. (Cl. 73—202)

My improved jets have particular application to air velocity measuring apparatus of the general type disclosed in prior patent Reissue No. 21,127 to John R. Boyle, and in the prior pending application of John R. Boyle, Serial No. 154,955, filed July 22, 1937, although it will be understood that the invention is not necessarily limited thereto.

In the performance of a velocity measuring operation by the above apparatus, a portable jet device is introduced directly into the air stream, which air stream may be entering a duct, flowing through a duct, issuing from a duct, or otherwise passing from one point to another as part of an air circulating system or other path of air flow. This jet device is a relatively small unit which can be conveniently held in the hand and moved to various points in the air stream, thereby enabling exploring readings and averaging readings to be taken at different points in the stream. This jet device is connected to a velocity meter or other indicating instrument capable of giving a direct indication or a computed indication of the velocity of the air stream at the particular point at which the jet device is then disposed. The jet device is preferably spaced from the body of the meter device a sufficient distance so that introducing the jet device into the air stream does not require introducing the meter device into the air stream, and, in consequence, the larger bulk and area of the meter device does not block the air stream nor produce eddy currents or turbulence such as would tend to introduce errors into the readings made with the jet device. Furthermore, the connection from the jet device to the meter device is preferably flexible so as to enable the jet device to be maneuvered into various angles or positions in the air stream, while still holding the meter device in more or less the same position where its readings can be most easily observed.

Furthermore, velocity measuring apparatus of the above general description enables different types of jet devices to be selectively coupled to the meter for measuring discharge velocities, suction velocities, average velocities, static pressure, etc.

The general object of the present invention is to provide an improved jet device of the suction type primarily intended for measuring the suction velocities prevailing at the air intakes of duct systems, fans, blowers, etc. This improved suction jet enables greater accuracy of readings to be obtained in the measurement of suction velocities than can be obtained by any other portable suction jet now known to me. These readings are substantially as accurate as can be obtained with precision instruments employing stationary Pitot tubes, manometer gauges and other non-portable equipment.

Another object of the invention is to provide an improved multi-purpose jet which can be readily converted from a suction jet to a discharge jet or vice versa. This conversion can be quickly and easily effected by merely removing or replacing a screw plug.

When the jet is functioning in either capacity for measuring suction velocities or for measuring discharge velocities, its readings are substantially as accurate as can be obtained with precision instruments employing stationary Pitot tubes, manometer gauges and other non-portable equipment.

Other objects, advantages and features of the invention will appear from the following detail description of two preferred embodiments thereof. In the accompanying drawings illustrating these embodiments:

Figure 1 is a diagrammatic view showing one embodiment of my invention in its use as a suction jet;

Figure 2 is a similar view showing this same embodiment in its use as a discharge jet;

Figure 3 is a longitudinal sectional view through this embodiment;

Figure 4 is an elevational view of the front end of the jet;

Figures 5 and 6 are transverse sectional views taken approximately on the planes of the lines 5—5 and 6—6 of Figure 3;

Figures 7 and 8 are diagrammatic views, similar to Figures 1 and 2, illustrating a modified construction of jet; and Figure 9 is a longitudinal sectional view through this modified construction.

Referring first to Figures 1 and 2, my improved jet is designated 15 in its entirety, this jet being connected through a length of rubber hose or other flexible conduit 16 with the velocity meter indicated in its entirety at 17, such meter being of the type disclosed in Reissue Patent No. 21,127. Figure 1 illustrates my improved jet in its principal utility as a suction jet, as, for example, to measure the suction velocities across the face of a suction grille 18 opening into an intake duct 19. Figure 2 illustrates my improved jet converted into a discharge jet, as, for example, for measuring the discharge velocities across the face of a discharge grille 21 leading from a discharge duct 22.

The improved jet comprises a main tube 25, a branch tube 26, and a guide fin or vane 27, these elements being rigidly secured together as a unitary structure. When the unit is to function as a suction jet, the main tube 25 remains open at both ends as shown in Figure 1, and is adapted to be positioned in line with the air flow, preferably with the straight edge 27' of the guide fin abutting against the outer face of the grille 18. When functioning in this capacity of a suction velocity jet, the left hand end 25' of the main tube constitutes the suction port or outlet of the jet, and the right hand end 25'' constitutes a by-passing or venting inlet for admitting a by-passing or compensating stream of air to the suction end 25'. The branch tube 26 intersects the main tube 25 preferably at right angles thereto and intermediate these end ports 25' and 25''. This branch tube 26, together with that portion of the main tube 25 extending from the branch tube to the velocity responsive port 25', constitute the main passageway P of the jet device through which all of the air passing through the meter 17 is adapted to flow. That portion of the main tube 25 which extends from the branch tube 26 to the inlet port 25'' constitutes a by-pass or compensating passageway P' through which a compensating flow of air is vented into the main passageway P, in by-passing relation to the meter.

The guide fin or vane 27 preferably consists of a thin strip of metal which is rigidly secured to the tube structure to extend substantially at right angles to the main tube 25. A very simple method of securing the guide fin to the tube structure is to cut a thin diametrical slot through the outlet end of the main tube 25 and through the adjacent portion of the branch tube 26, and to then secure the guide fin in this slot, as illustrated in Figures 3 and 4. The two tubes 25 and 26 are joined together at their intersection, and the guide fin is secured thereto, by soldering, brazing or welding, as desired. The straight line edge 27' of the fin 27, is preferably disposed flush with the outlet end 25' of the main tube 25. This straight edge 27' insures that the main tube 25 will be disposed parallel to the air flow (in the vertical plane) when this straight edge 27' is pressed up against the surface of a grille 18 or the like. That is to say, the right angle relation between the edge 27' and the axis of the by-pass tube 25 will insure this proper angular position of the by-pass tube when the guide fin is pressed up against a grille. The presence of the fin 27 also prevents the entire end of the by-pass tube being inserted into one of the openings in the grille, which might give erroneous readings. Furthermore, the guide fin aids the operator in keeping the by-pass tube 25 aligned with the air flow in the lateral plane, so that the flow of air through the tube 25 is accurately proportional in velocity, static pressure and volume to the main body of air entering the grille structure 18 over those areas immediately surrounding the jet device 15.

Each jet device is individually calibrated by a calibrating plug 33 in the by-pass tube 25, and by a calibrating plug 34 in the branch tube 26. The calibrating orifice 34' in the plug 34 is preferably slightly smaller than the calibrating orifice 33' in the plug 33. As exemplifying one ratio of sizes which gives satisfactory results for an average range of air velocities, the orifice 34' may be a No. 26 drill size (.1470 inch) and the orifice 33' may be a No. 20 drill size (.1610 inch). This relation of calibrating orifices gives good average range performance in jets constructed of tubing of ⅜ inch outside diameter and having a wall thickness of approximately .032 inch (resulting in an inside diameter of approximately .311 inch). The orifice plugs 33 and 34 individually calibrate each jet with respect to a standard meter or with respect to an individual meter with which the jet is to be used. By constructing the main tube 25 and the branch tube 26 of the same size tubing, the calibrating plugs or sleeves 33 and 34 may all be of a standard outside dimension.

When the jet is intended to be used alternatively either as a suction jet or as a discharge jet, the end 25'' of the by-pass tube 25 is provided with an internal thread 35 for receiving a threaded closure plug 36. This closure plug has a knurled head which enables it to be screwed into and out of position merely by finger manipulation. When the jet is intended to function as a discharge jet, the plug 36 is screwed into place as shown in Figure 2, thereby closing the outer end of the tube 25 and terminating by-pass flow through said tube. At this time, the jet functions very similarly to a conventional discharge jet having no by-pass tube.

The length of the by-pass tube 25, as indicated by the dimension $x$, is important for adapting the jet to the measurement of suction velocities over widely different areas of ducts. The prior forms of jets have been objectionable for measuring suction velocities because of large scale errors which occur as soon as it is attempted to use the same jet over different grilles, duct openings, etc., of widely varying areas. In my improved jet, by spacing the inlet end 25'' a substantial distance in an outward or anterior direction from the suction port 25', these errors are greatly reduced or minimized. I have found that in jet structures having approximately the proportions described above, the length $x$ of the by-pass tube should be from 5 to 6 times the diameter of the tube 25, or longer, for the average range of duct areas. This appears to place the inlet end or atmospheric vent 25'' at a point outwardly of or beyond the critical zone of air pressure change, i. e. the zone where the air changes most rapidly from static pressure to velocity pressure.

The meter 17 is preferably of the portable swinging vane type described in the aforementioned Reissue Patent No. 21,127 and in the prior copending application Serial No. 154,955. While this construction of meter is preferred from the standpoint of accuracy, portability, facility of handling, etc., it will be understood that my improved jet is not necessarily limited to use with that type of meter. Briefly described, this meter comprises an inlet or pressure port 41 in one side wall of the casing, and an outlet or suction port 42 in the opposite side wall of the casing (Figure 1). Extending between these ports is a curved air channel 43 in which swings a vane 44. Swinging with the vane is a pointer 45 which gives readings on a dial or scale card 46. Air entering the inlet port 41 acts on the vane tending to deflect it toward the right, such motion being opposed by a hair spring or other opposing spring force. When the meter is to be connected with the jet 15 through the flexible conduit 16, a coupling member 48 is screwed into the appropriate meter port for establishing connection with the conduit 16. If the jet is to be used as a suction jet, as shown in Figure 1, the coupling member 48 is screwed into the suction port 42, whereas if the jet is to be used as a discharge jet the coupling member is screwed into the pressure or inlet port 41, as shown in Figure 2. Such coupling member or members have reduced extensions 48' over which the hose 16 is passed. The branch tube 26 of the jet is provided with a limit collar 49 against which the hose is forced in coupling the hose to the jet.

In using the jet for measuring suction velocities, the jet is brought to a position against the grille 18 or in close proximity to the suction duct or other region of suction flow, with the axes of the tubes 25 and 26 lined up substantially parallel with the direction of flow. By reason of the fact that the branch tube 26 curves rearwardly and extends substantially parallel with the by-pass tube 25, there is a minimum tendency for this branch tube to cause blocking, turbulence or eddy currents in the vicinity of the by-pass tube 25. The outer extremity of the branch tube 26, which receives the end of the rubber hose 16, also serves as a handle or grip which the operator holds in his hand in maneuvering the jet. It will be noted that this disposes the operator's hand a substantial distance from the critical suction zone adjacent to the grille, so that his hand does not cause objectionable blocking or turbulence of the air flow. The jet is preferably made to approach the grille directly from the front, and the entire measuring operation, involving shifting the jet to different positions across the face of the grille, is performed substantially entirely from the front of the grille, as distinguished from the side thereof. The side manipulation is exemplified by the modified embodiment illustrated in Figures 7 to 9, inclusive. However, I find that the front manipulation with the embodiment shown in Figures 1 and 2 gives more accurate reading than the side manipulation with the modified embodiment shown in Figures 7 and 8.

Referring now to the operation of the device, it will be obvious that when the jet is measuring suction velocities, the sub-atmospheric pressure existing at the suction end 25' of the tube 25 creates a flow of air through the meter 17 and conduit 16 to give a velocity reading at the meter. This stream of air entering the meter inlet port 41 and passing through the meter channel 43 can be considered as one source of air supply flowing toward the suction end 25' of the tube 25, in attempting to satisfy the suction existing at this suction end of the tube. However, this is not the only source of air supply flowing to said suction end. The substantial stream of air which enters the atmospheric end 25'' of the by-pass tube and passes through the calibrating orifice 33' constitutes another source of air supply which flows to the suction end 25' of the tube 25. This second stream of air by-passes the meter, in that it flows to the same zone of rarefaction at the suction end 25' without passing through the meter channel. This by-passing or venting flow compensates for errors which appear in the suction velocity readings of other jets, which errors tend to increase toward the high velocity end of curves plotted therefrom. Comparing the accuracy of this suction jet in which a by-pass or compensating action occurs, to the prior suction jets in which no by-pass or compensating action occurs, I find that the by-pass action greatly increases the accuracy of the suction velocity curve, particularly in the upper part of the scale range. This suction velocity curve obtained under by-pass action checks very closely with the discharge velocity curve which is obtained when the jet is employed to measure discharge velocities, as shown in Figure 2. The two curves are practically identical over the entire scale range. And, of preeminent importance, this suction velocity curve under by-pass action is extremely accurate when checked against precision readings obtained by instruments employing stationary Pitot tubes, manometer gauges and the like.

Referring now to the modified embodiment illustrated in Figures 7, 8 and 9, this construction also comprises a by-pass or compensation tube 25, branch tube 26a and guide fin 27. However, in this modified embodiment the branch tube 26a is extended straight down at right angles to the by-pass or compensating tube 25, instead of being curved rearwardly to extend parallel to the by-pass tube. The slot for receiving the guide fin 27 extends down along a substantial length of the branch tube 26a, the fin being soldered, brazed or welded in this slot, substantially as above described. This modified embodiment also has the calibrating plugs 33 and 34 in the by-pass and branch tubes, and has the atmospheric end of the by-pass tube internally threaded at 35 for receiving the removable closure plug 36.

The operation of this modified embodiment is the same as the operation of the previously described embodiment, except that the modified jet is maneuvered across the face of the grille by manipulation from a point to one side of the grille. This modified embodiment can also be converted into a discharge type of jet by screwing the closure plug 36 into the outer end of the by-pass tube, as illustrated in Figure 8.

While I have illustrated and described what I regard to be the preferred embodiments of my invention, nevertheless it will be understood that such are merely exemplary and that numerous modifications and rearrangements may be made therein without departing from the essence of the invention.

I claim:

1. In a jet device for measuring suction velocities, a tube having one end adapted to be inserted into a suction velocity region and having another end connected with velocity measuring means of the swinging vane type permitting air flow therethrough, and by-pass means for admitting air into said tube in by-passing relation to said measuring means.

2. In a portable jet device adapted to be held in the hand and to be maneuvered to different positions in a zone of suction flow for measuring suction velocities, the combination of a tube having one end adapted to be inserted into said zone of suction flow and having another end adapted to be connected with a velocity meter of the spring retarded vane type permitting air flow therethrough, and by-pass means for admitting air into said tube intermediate said ends and in by-passing relation to said velocity meter.

3. In a portable jet device adapted to be connected with a portable velocity meter of the spring retarded swinging vane type permitting air flow therethrough, the combination of a tube having an outlet end adapted to be introduced into a zone of suction flow and having an inlet end adapted to be connected with said velocity meter, and means forming a by-passing orifice facing oppositely to said outlet end for admitting air into said tube in by-passing relation to said velocity meter.

4. In a jet device for measuring suction and discharge velocities, a tube having one end adapted to be inserted into a suction velocity region and having another end connected with velocity measuring means of the swinging vane type permitting air-flow therethrough, by-pass means for admitting air into said tube in by-passing relation to said measuring means, and means for preventing flow through said by-pass means when the jet device is measuring discharge velocities.

5. In a jet device for measuring suction and discharge velocities in an air stream, the combination of means defining a main port adapted to be inserted into the air stream, a passageway for connecting said port with velocity measuring means, means defining a by-pass port facing substantially oppositely to said main port for venting a compensating flow of air to said main port in by-passing relation to said velocity indicating means when measuring suction velocities, and means for blocking flow through said by-pass port when using said jet device to measure discharge velocities.

6. In a portable jet device for measuring suction velocities in an air stream, the combination of a tube structure defining a suction port adapted to be inserted into the air stream, a guide fin extending from said tube structure for indicating the desired position of said suction port relatively to the air stream, a passageway for connecting said suction port with a velocity meter, and means carried by said tube structure defining a by-pass port substantially spaced from said suction port and operative to by-pass air thereto.

7. In a portable jet device for measuring suction velocities in an air stream, the combination of a portable tube structure adapted to be held and maneuvered by hand to different positions in the air stream, said tube structure comprising a suction port adapted to have an air flow created therein in response to said suction velocities, a main passageway for connecting said port with a velocity meter, a by-pass passageway constituting a part of said portable tube structure and maneuverable therewith for venting air to said port substantially in by-passing relation to said meter, and a calibrated orifice in said by-pass passageway.

8. In a jet device for measuring suction velocities in an air stream, the combination of means defining a suction port adapted to have an air flow therethrough proportional to said suction velocities, a main passageway for connecting said port with a velocity meter, a by-pass passageway for venting air to said port substantially in by-passing relation to said meter, and calibrating orifices in each of said passageways, one of said calibrating orifices being larger than the other.

9. In a convertible jet device for measuring suction and discharge velocities, said jet device comprising a port adapted to have a fluid flow therethrough proportional to said velocities, means for connecting said port with velocity indicating means, by-pass flow means for conducting a by-pass flow to said port when the jet device is to measure suction velocities, and means for blocking said by-pass flow means when the jet device is to measure discharge velocities.

10. In a portable convertible jet for measuring suction and discharge velocities in air streams, the combination of a tube structure defining a port adapted to have a fluid flow therethrough proportional to said velocities, a passageway leading from said port and adapted to be connected with a velocity meter, a compensating inlet adapted to admit air to said port in shunt of said meter when the jet is measuring suction velocities, and means for preventing flow through said inlet when the jet is measuring discharge velocities.

11. In a jet device for measuring suction and discharge velocities in an air stream, the combination of a tube structure comprising a suction port adapted to be inserted into the air stream entering a duct or the like, a passageway for connecting said port with velocity measuring means, a by-pass inlet for admitting air to said suction port in by-passing relation to said velocity measuring means, said by-pass inlet being spaced from said suction port a sufficient distance to be disposed outwardly of or beyond the critical zone of air pressure change where the air changes most rapidly from atmospheric pressure to duct pressure, and means for closing said by-pass inlet for converting said jet device to the measurement of discharge velocities.

12. In a jet device for measuring suction and discharge velocities in an air stream, the combination of a tube structure comprising a suction port adapted to be inserted into the air stream entering a duct or the like, a passageway for connecting said port with velocity measuring means, a by-pass inlet for admitting air to said suction port in by-passing relation to said velocity measuring means, said by-pass inlet being spaced from said suction port a distance corresponding to five or six times the diameter of said suction port, or more, and means for closing said by-pass inlet for converting said jet device to the measurement of discharge velocities.

13. In a jet device for measuring suction velocities in an air stream, the combination of a tube structure comprising a suction port adapted to be inserted into the air stream entering a duct or the like, a passageway for connecting said port with velocity indicating means, a by-pass inlet for admitting air to said suction port in by-passing relation to said velocity indicating means, said by-pass inlet being spaced from said suction port a sufficient distance to be disposed outwardly of or beyond the critical zone of air pressure change where the air changes most rapidly from static pressure to velocity pressure, and calibrating orifice plugs in said passageway and in said by-pass inlet, the calibrated orifice in said passageway being smaller than the calibrated orifice in said by-pass inlet.

14. In a jet device for measurng air velocities at suction grilles, intake ducts and the like, the combination of a by-pass tube having a suction port at one end and an atmospheric inlet at the other end facing in the opposite direction from said suction port, said tube being of sufficient length so that when said suction port is disposed substantially against a suction grille said atmospheric inlet is disposed at a point outwardly with respect to or beyond the critical zone of air pressure change where the air changes most rapidly from atmospheric pressure to duct pressure, a branch tube leading from said by-pass tube and a spring retarded oscillatory vane type of air velocity meter connected with said branch tube and permitting air flow therethrough to said suction port.

15. In a jet device for measuring air velocities at suction grilles, intake ducts and the like, the combination of a by-pass tube having a suction port at one end and an atmospheric inlet at the other end, said tube being of sufficient length so that when said suction port is disposed substantially against a suction grille said atmospheric inlet is disposed at a point outwardly with respect to or beyond the critical zone of air pressure change where the air changes most rapidly from atmospheric pressure to duct pressure, a branch tube leading from an intermediate point of said by-pass tube and adapted for connection with an air velocity meter, calibrating orifice plugs in said by-pass tube and said branch tube, and a closure plug having removable screw threaded mounting in said by-pass tube for closing the atmospheric inlet when it is desired to convert the jet device for the measurement of discharge velocities.

16. In combination, velocity measuring means of the spring retarded swinging vane type, a portable jet device so connected with said velocity measuring means as to be maneuverable into different positions in a region of suction pressure independently of said velocity measuring means, and means separate from said velocity measuring means for admitting air into said jet device from a region of higher pressure.

17. A convertible jet for measuring suction and discharge velocities in air streams comprising a tube, a branch conduit connected with said tube intermediate the ends thereof for connection to an air velocity meter, an orifice member disposed in one end of said tube for flow of air from the atmosphere into said tube when said jet is used to measure suction velocities, and means for closing said one end of said tube when said jet is used to measure discharge velocities.

18. In apparatus of the class described, the combination of an air velocity meter having an inlet port and an outlet port, a jet device for connection with said meter comprising a main tube having an inlet end and an outlet end, a branch tube extending from said main tube, a flexible hose for connecting said branch tube with said meter, a calibrating orifice plug in the inlet portion of said main tube, a calibrating orifice plug of smaller size in said branch tube, and a removable closure plug for blocking the inlet end of said main tube, said jet device and meter serving to measure suction velocities when the outlet end of said main tube is inserted into the zone of suction velocities, with the flexible hose connected with the outlet port of the meter and the closure plug removed, and said jet device and meter serving to measure discharge velocities when the outlet end of said main tube is inserted into the zone of discharge velocities, with the flexible hose connected with the inlet port of the meter and the closure plug closing the inlet end of said main tube.

KENNETH H. MILLER.